3,123,441
SYNTHETIC CRYSTALLINE LITHIUM ALUMINUM SILICATE ZEOLITE AND METHOD FOR MAKING SAME
Walter L. Haden, Jr., Metuchen, and Frank J. Dzierzanowski, Somerset, N.J., assignors to Minerals & Chemicals Philipp Corporation, Menlo Park, N.J., a corporation of Maryland
No Drawing. Filed Oct. 4, 1961, Ser. No. 142,762
4 Claims. (Cl. 23—113)

This invention relates to a novel zeolite and method for making the same.

After extensive experimentation with the reaction of various alkalies with clays, we have discovered that the properties of lithium silicate hydrates obtained by reacting kaolin clay with aqueous solutions of lithium hydroxide vary with the preliminary treatment of the clay and with reaction conditions. This in turn has led to our discovery that a valuable novel synthetic crystalline zeolite can be produced from thermally dehydrated kaolin clay (metakaolin) and a very dilute aqueous solution of lithium hydroxide under conditions of controlled reaction temperature.

Stated briefly, the novel zeolite of this invention is a synthetic crystalline hydrated lithium aluminum silicate having a mol ratio of $Li_2O$ to $Al_2O_3$ of about 1:1 and a mol ratio of $SiO_2$ to $Al_2O_3$ of about 2:1. This zeolite is further characterized by having a base-exchange capacity which is considerably higher than the base-exchange capacity of other lithium aluminum silicate hydrates.

Following is the X-ray diffraction pattern of an equilibrated sample of the novel zeolite of this invention:

TABLE I

*X-Ray Diffraction Pattern of Lithium Aluminum Silicate Zeolite*

| "d" Spacing, A. | Relative Line Intensity, $I/I_0$ |
|---|---|
| 7.02 | 100 |
| 4.79 | 30 |
| 3.93 | 14 |
| 3.67 | 11 |
| 3.28 | 19 |
| 3.09 | 97 |
| 2.97 | 42 |
| 2.82 | 61 |
| 2.47 | 19 |

The powder diffraction pattern reported in Table I was obtained by standard powder diffraction procedure using K-alpha radiation and does not conform with the pattern of any known zeolites, natural or synthetic.

The novel zeolite of this invention, which is a white powder, can be used as a reinforcing filler or pigment for plastics and rubber.

Our zeolite has also been found to be capable of selectively adsorbing cesium ions from aqueous solutions containing sodium ions; therefore, the zeolite is useful in treating radioactive waste material in liquid form; such as, for example, low level radioactive waste, to remove cesium-137 and thereby aid in the safe disposal of the decontaminated liquid.

The lithium aluminum silicate of this invention is produced by reaction of metakaolin with a quantity of a dilute aqueous solution of LiOH in amount sufficient to provide at least 1 mol of $Li_2O$ per mol of metakaolin ($Al_2O_3.2SiO_2$). Reaction temperature must be low, about 70° F. to about 125° F., especially about 100° F., to prevent the formation of a different lithium aluminum silicate hydrate of the same approximate empirical formula as our novel zeolite, but having a higher surface area and lower base-exchange capaicty. This other lithium aluminum silicate hydrate has the X-ray diffraction pattern reported on ASTM Card 5-0181 and possesses none of the characteristic X-ray pattern diffraction maxima of the zeolite of this invention.

For some applications, it may be desirable to use our zeolite in base exchanged form, i.e., by exchanging the lithium of the zeolite for ions of other metals of group I of the periodic table, as well as ions of metals of group II, transition elements, hydrogen or ammonium ions. However, substitution of other bases, such as NaOH or KOH for LiOH in the reaction mixture with the starting metakaolin will not suffice to produce the novel zeolitic structure of the product of this invention.

Our zeolite is used as a filler for rubber or plastics in the finely divided form in which it is precipitated. For use in adsorptive contact processes, the powdered zeolite may be formed into pellets of suitable size using bonding agents such as are used in pelletizing industrial sorbents.

By "kaolin clay" is meant a naturally occurring clay containing at least one of the following as the chief mineral constituent: kaolinite, halloysite, anauxite, dickite, and nacrite. The aforementioned minerals are hydrous aluminosilicates whose composition may be represented by the formula:

$$Al_2O_3.2SiO_2.XH_2O$$

where X is usually 2, or 4 in the case of certain halloysites. The weight ratio of $SiO_2$ to $Al_2O_3$ indicated by this formula is 1.177 to 1. Kaolin clays are frequently associated with foreign materials such as quartz; the removal of such impurities from the starting clay is recommended.

To obtain metakaolin of suitable quality, kaolin is dehydrated by calcination at a temperature within the range of from about 800° F. to about 1600° F., and preferably 1200° F. to 1500° F. for a time sufficent to remove substantially completely the water of crystallization from the clay. Calcination should not be severe enough to cause the clay to undergo the characteristic kaolin clay exotherm.

In producing our novel sodium aluminum silicate from metakaolin, we use at least 2 mols of LiOH per mol of metakaolin ($Al_2O_3.2SiO_2$). Using 2 mols of LiOH per mol of metakaolin, it has been found that reaction requires about 20 hours for completion. The reaction mixture may be held at reaction temperature for longer periods than required to complete reaction. Completion of reaction is determined by periodically analyzing the LiOH content of the aqueous phase of the reaction medium and ascertaining the point at which LiOH concentration of the reaction medium remains essentially constant. The concentration of the LiOH in our reaction medium is from about 1% to about 8% by weight.

Our invention will be more fully understood by the following examples. As used in the examples and elsewhere in this application, surface area values are those obtained by a nitrogen absorption method described by S. Brunauer, P. H. Emmett and E. Teller in their article entitled "Adsorption of Gases in Multi-Molecular Layers," on page 309 of Journal of American Chemical Society, vol. 66, April 1944. Base-exchange capacities refer to values obtained using neutral ammonium acetate.

EXAMPLE I

In accordance with this invention, 150 gm. of commercial metakaolin (pigment 33) having an L.O.I. of 0.62% was slurried in 1500 ml. of distilled water. The slurry was heated to about 100° F. in an agitated flask connected to a reflux condenser. To this slurry there was added with agitation a solution of 55.4 gm. of lithium hydroxide monohydrate in 300 ml. of distilled water. The $Li_2O:Al_2O_3$ mol ratio of the composition was 1.0:1.0 and the $SiO_2:Al_2O_3$ mol ratio was 2.0:1.0. The LiOH concentration was 1.53%. The mixture was maintained at 100 to 102° F. with agitation for about 24 hours. The slurry was then filtered, the insoluble precipitate washed with 5 liters of distilled water and dried at 220° F. for about ½ hour and pulverized.

An X-ray diffraction pattern of the dried product, equilibrated at 70% R.H., was obtained by standard procedures using K-alpha radiation, an X-ray diffractometer using a scintillation counter and a strip chart pen recorder. The relative intensity of the peaks and the inter-planer spacings ("d" values) were calculated from the peak heights recorded on the chart in conventional manner. The product was found to possess the "d" values and corresponding line intensities of the material reported in Table I. Also present as an impurity was the lithium aluminum silicate hydrate having the diffraciton pattern reported in ASTM Card 5-0181.

The chemical analysis of the lithium aluminum silicate hydrate product is as follows, where all oxides are reported on a volatile free basis:

| | Weight percent |
|---|---|
| $Li_2O$ | 10.58 |
| $Al_2O_3$ | 40.24 |
| $SiO_2$ | 46.32 |
| $TiO_2$ | 1.36 |
| $Fe_2O_3$ | 0.24 |
| F.M.[1] | 0.99 |
| L.O.I.[2] | 18.54 |

[1] Free moisture, determined by heating sample to essentially constant weight at about 220° F.
[2] Loss on ignition, determined by heating sample to essentially constant weight at about 1800° F.

This analysis indicated the formation of a hydrated lithium aluminum silicate of the following composition:

$$0.90\ Li_2O:\ 1.00\ Al_2O_3:\ 1.96\ SiO_2:\ 3.14\ H_2O$$

The product was found to have the properties reported in Table II.

TABLE II

*Properties of Lithium Aluminum Silicate Hydrate Obtained by Reaction of Metakaolin With Dilute LiOH Solution at 100° F.*

Base exchange capacity 331.7 meq./100 gm.
Oil absorption _____ 168.8 gm. oil/100 gm. sample.
Surface area _____ 31 m.²/gm.
pH of 5% aq. sol. ____ 8.65.
True density _____ 2.14 gm./cc.
Tamped bulk density __ 22.8 lbs./ft.³.

EXAMPLE II

To compare the hydrated lithium aluminum silicate produced in accordance with this invention with other hydrated lithium aluminum silicates, the procedure of Example I was repeated with reaction being carried out at about 215° F. and reaction time shortened to 2 hours to account for the more rapid reaction between the metakaolin and LiOH solution at the elevated temperature.

There was obtained a hydrated lithium silicate having the following chemical analysis, wherein all oxides are reported on a volatile free basis:

| | Weight percent |
|---|---|
| $Li_2O$ | 10.31 |
| $Al_2O_3$ | 40.35 |
| $SiO_2$ | 46.51 |
| $TiO_2$ | 1.40 |
| $Fe_2O_3$ | 0.20 |
| F.M. | 2.06 |
| L.O.I. | 16.42 |

An X-ray diffraction pattern of an equilibrated sample of the product obtained at a reaction temperature of 215° F. indicated that the only crystalline material present was the zeolite identified in ASTM Card 5-0181; none of the characteristic diffraction maxima of our novel zeolite was present.

To compare further the zeolite obtained at elevated temperature with the zeolite of this invention, the properties of the product of Example II were determined with the results reported in Table III.

TABLE III

*Properties of Lithium Aluminum Silicate Obtained by Reaction of Metakaolin With Dilute LiOH Solution at 215° F.*

Base exchange capacity 132.9 meq./100 gm.
Oil absorption _____ 213.7 gm. oil/100 gm. sample.
Surface area _____ 44.7 m.²/gm.
pH of 5% aq. sol. ____ 8.80.
True density _____ 2.18 gm./ml.
Tamped bulk density __ 22.5 lbs./ft.³.

A comparison of the data reported in Table III with the data in Table II shows that the particular lithium aluminum silicate hydrate obtained by reacting metakaolin and LiOH is dependent upon the temperature at which the components were reacted. The data indicate that although the products from reaction at 100° F. and 215° F. with identical reactants had a similar chemical analysis, they had a marked difference in base-exchange capacity ranging from 132.9 to 331.7 meq./100 gm. for products obtained at 215° F. and 100° F., respectively. Also, there was a significant difference in oil absorption values of the two products, with the sample obtained at the higher temperature having an exceptionally high oil absorption value of 213.7 gm. oil/100 gm. as compared with an oil absorption value of 168.8 gm. oil/100 gm. for the product of Example I. Since chemical composition was similar, this difference in base-exchange capacity and oil absorption value is attributed to a difference in structure rather than to a difference in chemical composition.

We claim:

1. A synthetic crystalline hydrated lithium aluminum silicate having $Li_2O$ to $Al_2O_3$ mol ratio of about 1:1 and a $SiO_2$ to $Al_2O_3$ mol ratio of about 2:1, said silicate being further identified by possessing the following X-ray diffraction pattern:

| "d" Spacing, A. | Relative Line Intensity, $I/I_0$ |
|---|---|
| 7.02 | 100 |
| 4.79 | 30 |
| 3.93 | 14 |
| 3.67 | 11 |
| 3.28 | 19 |
| 3.09 | 97 |
| 2.97 | 42 |
| 2.82 | 61 |
| 2.47 | 19 |

2. A synthetic crystalline zeolite consisting essentially of a lithium aluminum silicate of the approximate formula:

$$Li_2O \cdot Al_2O_3 \cdot 2SiO_2 \cdot 4H_2O$$

said silicate having a base-exchange capacity of about 330 meq./100 gm. and being further identified by possessing the following X-ray diffraction maxima:

| "d" Spacing, Å. | Relative Line Intensity, $I/I_0$ |
|---|---|
| 7.02 | 100 |
| 4.79 | 30 |
| 3.93 | 14 |
| 3.67 | 11 |
| 3.28 | 19 |
| 3.09 | 97 |
| 2.97 | 42 |
| 2.82 | 61 |
| 2.47 | 19 |

3. A method for producing a zeolitic material useful as a rubber filler or pigment which comprises mixing metakaolin with an aqueous solution of LiOH of about 1% to 5% concentration, using a quantity of said solution sufficient to provide at least 2 mols of LiOH per mol of metakaolin, maintaining said mixture at a temperature within the range of from about 70° F. to about 125° F. for a time sufficient to react substantially completely said metakaolin with said LiOH and separating and drying a precipitated reaction product, said reaction product having a $Li_2O$ to $Al_2O_3$ mol ratio of about 1:1 and a $SiO_2$ to $Al_2O_3$ mol ratio of about 2:1, and being further identified by possessing the following X-ray diffraction pattern:

| "d" Spacing, Å. | Relative Line Intensity, $I/I_0$ |
|---|---|
| 7.02 | 100 |
| 4.79 | 30 |
| 3.93 | 14 |
| 3.67 | 11 |
| 3.28 | 19 |
| 3.09 | 97 |
| 2.97 | 42 |
| 2.82 | 61 |
| 2.47 | 19 |

4. The method of claim 3 wherein said mixture is maintained at about 100° F. for about 2 to 40 hours.

References Cited in the file of this patent
UNITED STATES PATENTS
3,009,776  Sensel _____ Nov. 21, 1961
OTHER REFERENCES
Barrer et al.: "J. Chem. Soc.," pages 1276–1278 (1951).
Kumins et al.: "Ind. and Eng. Chem.," 45 567–72 (1953).